Dec. 21, 1954   W. S. WATROUS   2,697,322
CUTTER MEMBER FOR ROTATING DISK TYPE LAWN MOWERS
Filed Nov. 10, 1949
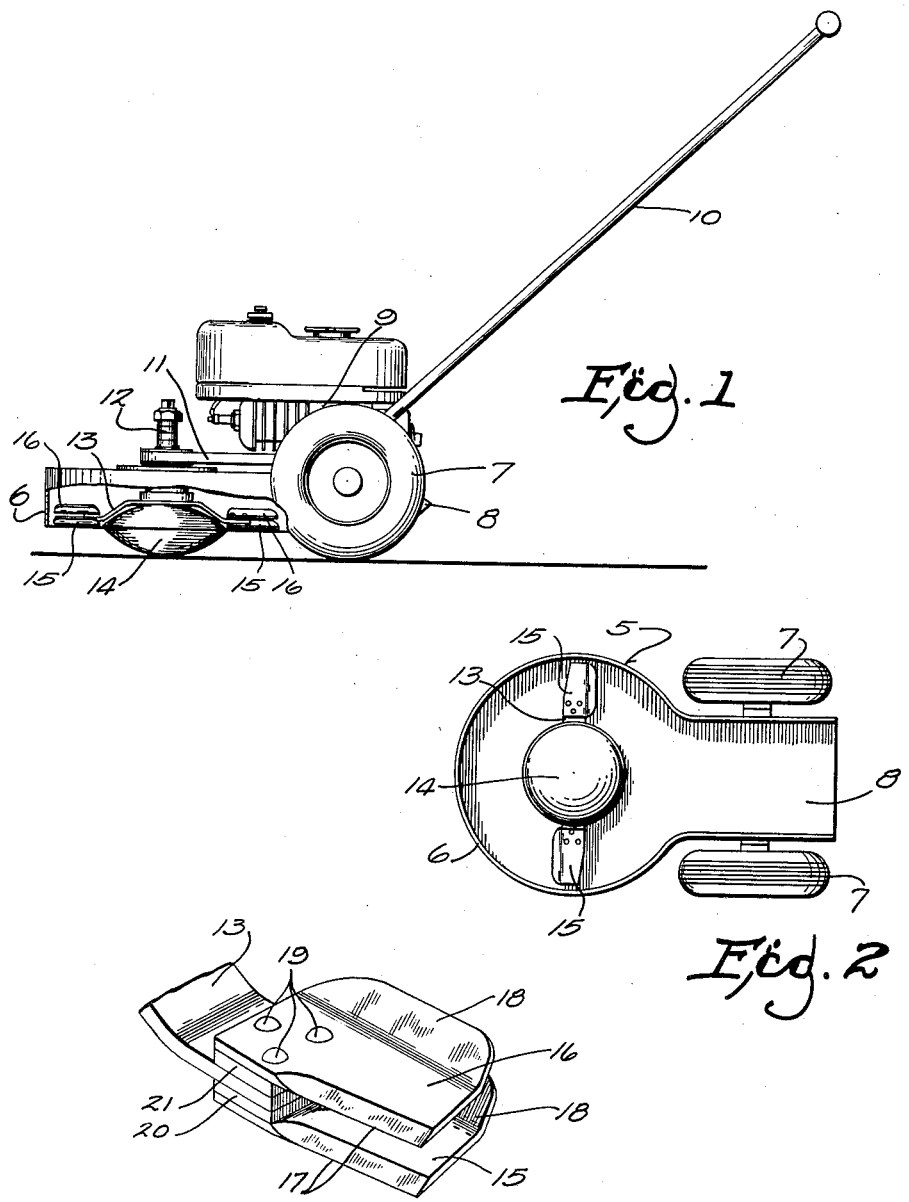
INVENTOR.
WINSTON S. WATROUS
BY
Wheeler, Wheeler & Wheeler
ATTORNEYS 0
United States Patent Office 2,697,322
Patented Dec. 21, 1954

2,697,322

CUTTER MEMBER FOR ROTATING DISK TYPE LAWN MOWERS

Winston S. Watrous, Sarasota, Fla., assignor to Watrous Corporation, Milwaukee, Wis., a corporation of Wisconsin Application November 10, 1949, Serial No. 126,552

5 Claims. (Cl. 56—295)

This invention relates to improvements in power lawn mowers of the rotary sickle type.

It is a primary object of the invention to provide means whereby such a mower will not only mow grass and weeds, but will comminute leaves and other litter, reducing them to such minute particles that they will fall between the grass blades of a lawn and not only disappear from view but act as an effective mulch for the grass. Thus, in traversing a lawn, it is sought simultaneously to cut the grass and to pulverize all litter, leaving the lawn neat and clean.

In the drawings:

Fig. 1 is a view diagrammatically illustrating partially in longitudinal section and partially in side elevation a mower embodying this invention.

Fig. 2 is a bottom plan view of the mower shown in Fig. 1.

Fig. 3 is an enlarged fragmentary detail view in perspective of a special blade arrangement used to effectuate the objectives of this invention.

The mower illustrated may be of the type more particularly disclosed in my companion application Serial No. 77,021, filed February 16, 1949, now Patent 2,669,826 issued February 23, 1954, and entitled "Lawn Mower of the Rotating Sickle Type." There is a wheeled frame which includes a housing 5 having a generally cylindrical side wall 6 and supporting ground wheels at 7 which carry the rearwardly directed delivery channel 8 opening from such housing. An engine 9 serves as a prime mover and the usual handle is provided at 10.

The engine is connected by belt 11 to shaft 12 for the actuation of a cutter head which comprises an arm 13 mounted on the shaft. As disclosed in my companion application above identified, there may be a convex shoe 14 supporting the cutter head from the underlying ground to prevent "scalping" and adjustable to determine the length at which the grass is to be cut but with the blades 15, 16, mounted at the ends of the arms 13, these blades may be identical to each other. Each is preferably provided with a cutting edge 17 and each desirably has an upwardly inclined air propelling flange 18 at its rear margin. The blades have mounting holes correspondingly located so that both blades are held in parallel but mutually spaced relationship to the ends of the arm 13 by a single set of rivets 19.

Since the arm 13 does not ordinarily have sufficient thickness to support the blades at the spacing found most desirable, I prefer to use spacing shims 20, 21 between the respective blades and the arm 13. The rivets 19 pass through these shims.

While the spacing between the blades may be varied within a substantial range, it has been found that for best results it should neither be too slight nor too great. When the blades are spaced at a distance between their cutting edges of one-half inch to three-quarters inches, they give optimum results. At a spacing of less than one-fourth inch or more than one inch, the results cease to be satisfactory.

The blades together have the same effect as a single blade so far as grass cutting is concerned. That is to say, they create an upward current of air which lifts the stems and leaves or blades of grass. In so far as these are still joined to the earth, they are placed under tension by the pneumatic current thus established and this assists in the shearing action thereon of the cutting edge 17 and the lower blade 15. If the stems, leaves or blades are sufficiently long, they may also be acted upon simultaneously by the cutting edge 17 of the upper blade 16.

Ordinarily, however, the upper blade will be effective for the purposes of the present invention primarily upon the leaves of trees which are not parts of any growing plant but are lying loose upon the lawn. A single blade will tend merely to cut tree leaves into relatively large sectors which are then discharged through the channel 8 at the rear of the mower. Where multiple blades are used, as herein exemplified by the two blades shown in Fig. 3, their cutting edges being proximate and generally parallel, an entirely different action seems to be established, each leaf apparently tending to lodge transversely of the blades for the instant required for the blades to cut through the leaf on spaced lines. The pieces then appear to be caught in similar manner across the edges of the next successive set of blades in the rapid rotation of the cutting head, and are again held transverse with respect to the line of cut to receive further reduction in size. This action continues until the resulting fragments are so small as to slip between the blades of grass and disappear from the surface of the lawn, resulting in an effective mulch.

What is claimed is:

1. A blade assembly for a rotary sickle mower, said assembly comprising a pair of blades having proximate cutting edges, and means spacing the respective blades for action in unison upon leaves and litter to be comminuted, the cutting edges of the respective blades being substantially parallel and the spacing thereof lying within a range of not less than one-fourth inch and not greater than one inch.

2. A blade assembly for a rotary sickle mower, said assembly comprising a pair of blades having proximate cutting edges, and means spacing the respective blades for action in unison upon leaves and litter to be comminuted, the respective blades and their respective cutting edges being substantially parallel and the spacing between the cutting edges being within a range of from one-half to three-fourths of an inch.

3. The device of claim 2 in which at least one of the respective blades has an upwardly turned flange at its rear margin remote from said cutting edge.

4. A mower of the character described comprising the combination with an upright shaft and a transverse arm connected for rotation therewith, of upper and lower blades mounted in sets at each end of said arm, said blades having corresponding and mutually spaced cutting edges for action in unison on material to be comminuted and upwardly turned rear marginal flanges.

5. A mower of the character described comprising the combination with an upright shaft and a transverse arm connected for rotation therewith, of upper and lower blades mounted in sets at each end of said arm, said blades having corresponding and mutually spaced cutting edges and upwardly turned rear marginal flanges, and spacing shims intervening between the respective blades and the upper and lower surfaces of said arm, said shims maintaining said edges at a spacing of less than one inch and more than one-fourth inch.

References Cited in the file of this patent

UNITED STATES PATENTS

| Number | Name | Date |
|---|---|---|
| 2,203,198 | Junge | June 4, 1940 |
| 2,245,821 | Poynter | June 17, 1941 |
| 2,547,540 | Roberts | Apr. 3, 1951 |